US006191886B1

(12) United States Patent
Sinkoff

(10) Patent No.: US 6,191,886 B1
(45) Date of Patent: Feb. 20, 2001

(54) VIDEO PROJECTION SCREEN ASSEMBLY

(75) Inventor: Daniel Sinkoff, Weston, FL (US)

(73) Assignee: Vutec Corp., Miami, FL (US)

( * ) Notice: Under 35 U.S.C. 154(b), the term of this patent shall be extended for 0 days.

(21) Appl. No.: 09/138,942

(22) Filed: Aug. 24, 1998

(51) Int. Cl.⁷ .................................................. G03B 21/56
(52) U.S. Cl. ........................................... 359/443; 359/461
(58) Field of Search ................................... 359/443, 460, 359/461, 451; 160/124, 265, 370.22

(56) References Cited

U.S. PATENT DOCUMENTS

| 4,639,106 | * | 1/1987 | Gradin | 353/13 |
| 4,790,598 | * | 12/1988 | Locher | 297/325 |
| 5,121,977 | | 6/1992 | Weisgerber | 359/450 |
| 5,292,169 | | 3/1994 | O'Brian | 296/98 |
| 5,438,780 | | 8/1995 | Winner | 40/514 |
| 5,468,040 | | 11/1995 | Hsieh et al. | 296/97.4 |
| 5,562,144 | | 10/1996 | Ming-Shun | 160/370.22 |
| 5,653,278 | * | 8/1997 | Cheng | 160/370.22 |
| 5,706,130 | * | 1/1998 | Rosen | 359/443 |

FOREIGN PATENT DOCUMENTS

1383692 * 11/1964 (FR) ...................................... 359/461

* cited by examiner

Primary Examiner—Christopher E. Mahoney
(74) Attorney, Agent, or Firm—Malloy & Malloy, P.A.

(57) ABSTRACT

A video projection screen assembly for the viewing of images projected thereon and designed to be selectively disposed between an exposed, expanded position for viewing and a collapsed position for storage. A viewing screen is mounted on and supported by a support frame structured to dispose and maintain the viewing screen in the vertical, expanded position for viewing wherein the support frame includes a positioning assembly including one or more spring biased sets of arms wherein each arm set includes a gas spring mounted thereon and cooperatively structured to provide sufficient driving force for disposition of the viewing screen into the vertically oriented, expanded position for viewing when released from its collapsed position. The viewing screen is formed from a relatively heavy, durable, material having sufficient flexibility to be rolled upon itself or otherwise disposed in a collapsed position for storage of the screen and the support frame in an out-of-sight location.

24 Claims, 4 Drawing Sheets

VIDEO PROJECTION SCREEN ASSEMBLY

BACKGROUND OF THE INVENTION

1. Field of the Invention

This invention relates to a video projection screen assembly having a viewing screen and accompanying supporting frame which may be selectively positioned between a vertically oriented, exposed position for viewing, and a collapsed position for storage and/or transport, wherein the viewing screen may be automatically expanded upwardly to assume the viewing position from a floor mounted or similarly located housing, cabinet or like support structure, in an efficient manner which maintains a flat screen during use and is capable of supporting large screen dimensions.

2. Description of the Related Art

Typically, projection screens, such as those specifically structured to display video images for televisions or projectors, are formed from a relatively heavy, durable material and include an exterior surface treatment on the exposed portion of the screen being viewed which facilitates a clear and accurate depiction of the video images being projected thereon. Depending upon the particular application or utilization, video projection screens are either permanently mounted in an upright, exposed, vertical orientation, such as when use of the viewing screen is a common or regular occurrence, or such viewing screens are structured to be retracted and stored until a use is required. Of the storable type of screens, they may be configured in a portable assembly, or may be fixed in an out of the way storage location. Such storable screens typically include structure that permits the screen to be rolled upon itself over a roller or like structure for eventual containment within an elongated, generally cylindrical housing. When disposed in a fixed position, such storable screens and/or the housing containing the screen are normally mounted in elevated locations, such as in a ceiling or suspended in a raised location on an elevated bracket secured to a wall or like supporting surface. As such, when use of one of the storable screens is required, the viewing screen that has been disposed in a rolled up orientation for storage is manually or otherwise removed from the housing by unrolling the screen from its stored location, and lowering it downwardly into an exposed, vertical orientation for viewing, thereby permitting gravity to assist the deployment and maintenance of the screen in a viewing orientation.

As can be appreciated, however, it is not always convenient or aesthetically appealing to maintain a bracket and/or suspended storage housing in a ready to deploy, elevated location. Such is particularly the case with home entertainment units or office presentation systems wherein it may be very costly or impractical to recess the structure into a ceiling or wall, but continual deployment of the screen itself is not desired. In such circumstances, the available technology of the related art leaves users who cannot build expensive recessing structures and want to conceal the screens with no alternative choice but to leave a screen storage housing permanently suspended and visible, or to utilize portable structures. Of course, such portable structures have a number of drawbacks as well.

Specifically, existing portable structures are typically limited to generally smaller, lower quality screens because of conventional space and weight limitations. This can be a serious drawback when utilizing high quality projection equipment and/or when better picture quality is desired. A primary reason for this drawback is the suspension structure that must be employed with the portable screen assemblies. In particular, existing screen deployment structures require that an elevated suspension bracket be present so that the housing may be hung. Typically, however, either due to structural reasons or merely because the aesthetics of a location make it undesirable, such a permanent bracket is not present. As a result, the assembly must provide its own suspension bracket. The most common type of bracket involves a tripod type assembly with a telescoping support rod. Such a structure is necessarily light weight due to its portable nature and due to the fact that various components must be telescoped upwardly and suspended on a collapsible base. Accordingly, the weight, size and quality of the screen that can be effectively deployed is severely limited.

A further drawback associated with portable and even permanently secured storable screens is the need to maintain proper tension for a flat screen surface. Existing structures typically rely on a single, centrally disposed hook or clip to maintain the screen in its viewing orientation. Naturally, such fastening can lead to deformation of the screen during its use. Still, however, increasing the tension or securement of the deployed lower edge of the screen is not practical utilizing existing systems because of the added structure required to substantially secure the entire edge of the screen. Moreover, because of the generally light weight nature of the suspension bracket, too much tension cannot generally be applied, or the screen may collapse on itself.

Accordingly, there is a substantial need in the art for a new type of video projection screen assembly that is capable of being utilized with thick, high quality screens of all sizes, in either a portable or otherwise storable manner. Such an assembly should maintain effective screen tension and should be conveniently deployable in a manual or remote fashion. Furthermore, such a system should be structured so as to be effectively concealable when not in use, such as in a cabinet or other article of furniture, so as to substantially mask its presence and such that an aesthetic appearance of a location is not detracted because of the need for permanent mounting structures. Also, such an improved assembly should be portable without compromising screen quality and deployment tension, and unlike conventional storable designs should be capable of automatic deployment.

In the design and structure of a preferred video projection screen assembly of the type set forth above, it has been noted that there are in existence other mechanisms in other arts for positioning flexible material structures from a rolled up, stored position to an outwardly extended, planer or expanded position. For example, it is known that certain commercially available mechanisms, such as of the type commonly used for the selective positioning of shade awnings between a stored position and an outwardly extended, operative position have been known and utilized for many years. Typically, such an awning positioning mechanisms include a plurality of arms disposed in spaced apart relation to one another. The arms are disposable in either a folded orientation or in an extended, operative position. Moreover, the awning material is secured to the arms in a manner which facilitates the substantially horizontal, outward extension of the awning from an exterior location on the building and in overlying relation to a door or window for purposes of providing shade as well as other protection from the elements. In order to facilitate extension, these awning structures typically include a biasing spring between the arms so as to assist with the deployment of the awning when use is desired. It is important to note, however, that the awning, when in its operative position is substantially horizontally oriented, and most commonly downwardly angled. As a result, the forces of gravity greatly assist and work with the relatively weak biasing spring during deployment and during maintenance of the awning in its extended position. Naturally, such a conventional structure would be un-effective for use in the vertical, upward deployment of a video screen wherein the weight of the screen and the forces of gravity counter the positioning assembly. Indeed, it is noted that with conventional biasing springs, a typical structure includes a compressed spring that is expanded when the awning is extended. As a result, the spring is at its weakest and least stable when the awning is fully deployed such that the force of gravity is the primary factor maintaining the awning deployed. Of course, such a configuration would not function to maintain a video screen vertically deployed. Moreover, given a preferred embodiment wherein the video screen assembly includes a concealing housing or cabinet, a conventional structure would be insufficient to open a concealing lid while also deploying the screen. As a result, it is evident that someone of ordinary skill in the art would not look to conventional awning deployment structures for assistance with a video screen assembly.

Accordingly, there is still a substantial need in the art relating to video projection screens for an assembly which efficiently and effectively deploys video screens of various sizes, including larger more heavy weight sizes, into a vertical orientation from a base storage location. Such a system should be capable of automatic deployment and should not require additional mechanisms or manipulation in order to maintain the screen taut and effectively deployed during use.

SUMMARY OF THE INVENTION

The present invention relates to a video projection screen assembly designed to be selectively disposed between an exposed position for viewing, and a retracted position for storage or transport. More particularly, the video projection screen assembly of the present invention includes a screen. The screen is designed to be disposed in a generally collapsed position, when the assembly defines its stored or retracted position, and can be concealed in a floor area or cabinet of a room or the like in which it is intended to be used. For example, the video projection screen assembly of the present invention is preferably integrated into an enclosing, substantially concealing housing or cabinet having a lid, cover or other type of closure structure which is automatically opened or closed depending upon the screen being disposed in its exposed or retracted position as set forth above.

In the video projection screen assembly of the present invention the viewing screen is formed of a relatively, durable material having sufficient flexibility to be selectively positioned in either a taut, planer position when exposed for viewing or alternately in its collapsed position. In such a collapsed position, the viewing screen is preferably rolled upon itself, such as on a take up roller rotationally mounted in operative association with a base portion of the assembly.

As will be explained in greater detail hereinafter, a positioning assembly is included and serves to "automatically" dispose the viewing screen in the exposed position when desired by a user. This is done primarily due to the fact that the positioning assembly is structured and normally biased to urge or facilitate travel of the screen into the aforementioned exposed position. Conversely, when it is desired to dispose the viewing screen in the collapsed position, an electrically powered motor or alternately a manually powered hand crank may be applied to an exterior fitting serving to manipulate the aforementioned take up roller within the aforementioned cylindrical housing in which the viewing screen is stored. Forced rotation of the take up roller will serve to lower the screen against the biasing force exerted thereon by the positioning assembly, thereby retracting the entire assembly.

The positioning assembly itself preferably comprises at least one, but preferably two sets of arms disposed in interconnected relation between a base portion of a support frame and a first portion of the support frame. The aforementioned first portion is preferably defined by an elongated bar or rod secured to an upper, outermost peripheral edge of the viewing screen and travels with the viewing screen as it is selectively positioned between the expanded and collapsed positions. The positioning assembly further includes at least one, but preferably a pair of piston assemblies, such as gas springs, interconnected between the two arm segments of each arm set. Each of the gas springs comprises a piston and cylinder arrangement specifically structured to be normally biased, without external connections to a gas supply, into an extended configuration. Accordingly, when the screen is "released" from its collapsed position, the gas springs, interacting with the two arms of each arm set, will expand or extend outwardly thereby serving to separate or extend the two arms of each arm set from one another. This action will serve to raise the viewing screen into the preferred vertical orientation which defines the expanded position of the viewing screen for viewing.

Due to the fact that the viewing screen is formed from a relatively heavy material of the type well known in the industry to facilitate clear and accurate viewing of the video images depicted thereon, a significant "driving force" is preferred to force the screen from its collapsed position and maintain it effectively in its taut, substantially vertical and planer orientation to facilitate proper viewing. In addition the driving force should be sufficient to automatically force open any lid or like closure serving to cover a housing for the projection screen assembly of the present invention. Accordingly, the positioning assembly of the present invention preferably includes two of the gas springs independently or in addition to a more conventional auxiliary spring structure, which may be in the form of one or more biasing springs cooperatively structured with and mounted on or within each of the arm sets so as to interconnect the first portion and the base portion of the support frame.

Typically, the biasing spring structure, if integrated with each arm set serves to "spring load" each arm set such that when unrestrained, the two arm segments of each arm set will have a tendency to "straighten out"; aligning themselves end to end rather than in a folded, side by side orientation when in the stored position. It is this spring loaded tendency, as further aided by the structure and position of the gas springs, that functions to orient the arm segments of each set of arms such that they extend the screen from its collapsed position into its exposed, vertically oriented position.

Accordingly, an important feature and object of the present invention is the providing of sufficient driving force to maintain a viewing screen of relatively heavy, durable material in a vertically oriented, exposed position and "automatically" accomplish positioning of the viewing screen from its normally stored positioned to the exposed, vertically oriented position.

It should be apparent that the weight of the screen is directly related to the size of the screen and accordingly, the larger viewing screen sizes may very well require even additional driving force applied to the viewing screen and more particularly, such a force is preferably applied between the base portion of the support frame and the lower most arm segment of the expanding arm set. For example, such additional or supplementary driving force is preferably supplied by the provision of at least one but preferably a plurality of supplemental gas springs equal in number to the number of sets of arms. Each of the supplemental gas springs are interconnected between the base portion of the support frame and a lower most arm segment of each set of arms serving to drivingly interconnect the first portion to the base portion. Therefore, when the screen is "released" from its stored position, the driving force tending to position the viewing screen into its exposed, vertically oriented position will be supplemented through the provision of the one or more supplemental gas springs serving to exert additional driving force on each of the arm sets.

Therefore, it is a primary object of the present invention to provide a video projection screen assembly including a support frame connected in supporting relation to a viewing screen wherein the viewing screen is selectively positionable between a collapsed position for storage and an outwardly expanded, vertically oriented position for viewing.

Still another important object to the present invention is to provide a video projection screen assembly which may be mounted within a concealing cabinet, housing or like structure disposed in supported relation on a floor, desk, or the like in which the video projection screen assembly is located, for subsequent raising of the video screen.

Another primary object to the present invention is to provide a video projection screen assembly including a support frame having structural components specifically designed and structured to provide sufficient driving force to position the viewing screen and attached, structural components secured thereto out of the collapsed position and into the vertically orientated, expanded position for viewing.

It is also an important object of the present invention to provide a video projection screen assembly which may be selectively positioned between a collapsed position and an outwardly extending, expanded, vertically oriented position, for viewing which is not required to be mounted in an out of the way location such as within a ceiling or at other raised locations on a vertical wall or like supporting surface.

Another object of the present invention is to provide a video projection screen assembly incorporating a positioning assembly specifically structured to provide sufficient driving force to related components of a support frame so as to easily and freely position the viewing screen from a collapsed position to the vertically oriented, expanded position wherein the screen is exposed for viewing.

Yet another object to the present invention is to provide a video projection screen assembly formed of long lasting, durable components, including a viewing screen formed of a relatively heavy and durable material to facilitate clear and accurate viewing of video images projected thereon thereby assuring a long operable life of the subject video projection screen assembly.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
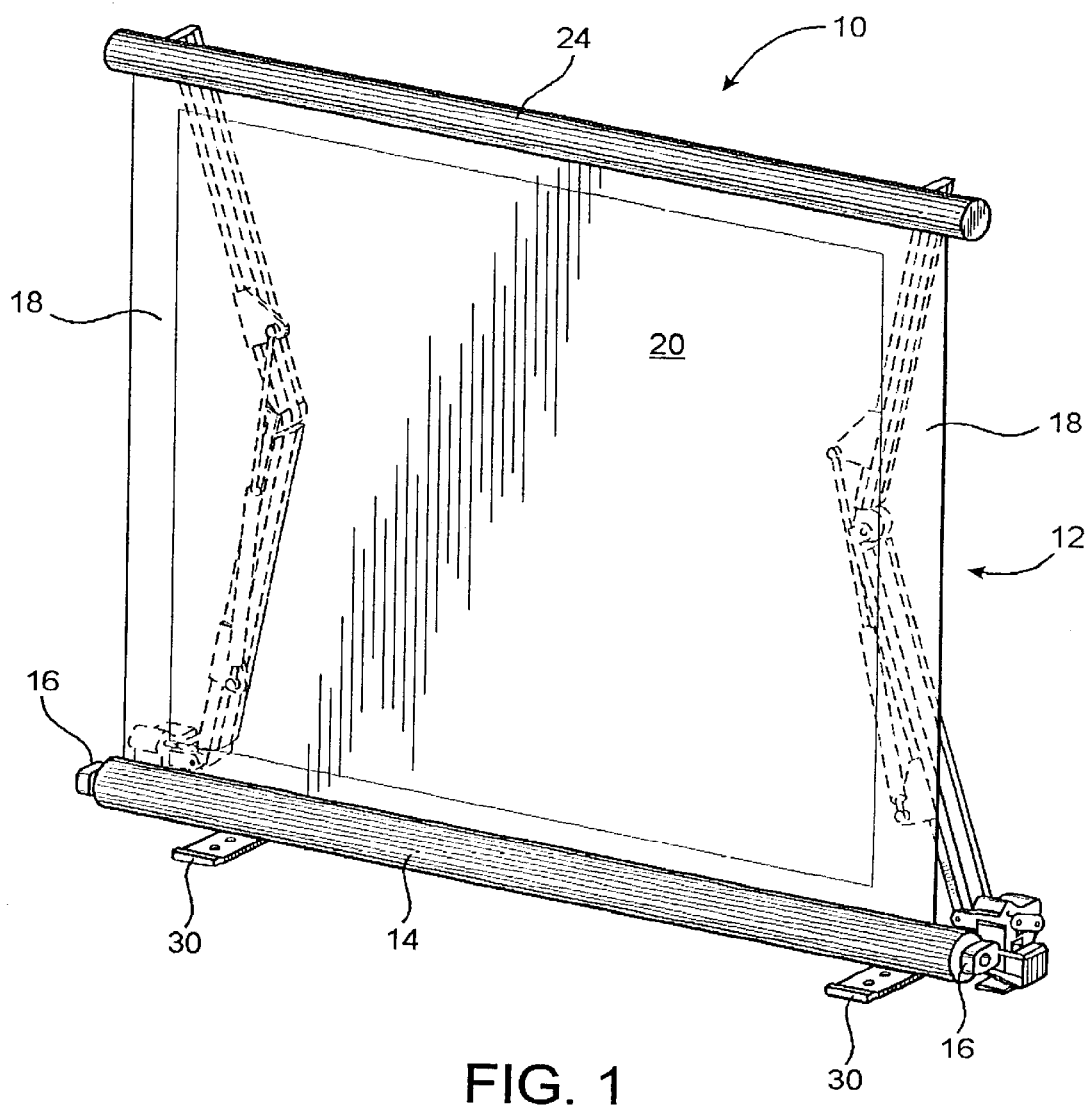
FIG. 1 is a perspective view in partial phantom of a video projection screen assembly of the present invention.

In accordance with the accompanying Figures, the present invention is directed to a video projection screen assembly generally indicated as 10. The video projection screen assembly 10 includes primarily a viewing screen 12 formed of a material having sufficient flexibility to be disposed in an outwardly expanded or exposed position for viewing, as shown in FIG. 1, or alternately in a retracted, stored position. For example in the embodiment of FIG. 1, within an elongated, substantially hollow and preferably cylindrical storage casing 14 may be provided and operatively associated with a base portion of the assembly 10. When in the casing 14, the viewing screen 12 is preferably disposed in a rolled up configuration about a take-up roller (not shown for purposes of clarity). The take-up roller extends between two drive couplings or brackets as at 16 located exteriorly of the storage casing 14 and which are preferably structured to be interconnected to an electrically powered drive motor or a manually powered hand crank or other applicable device which serves to rotate the supply roller mounted on and between the externally located drive couplings 16. Preferably, this take up structure is also sufficient to retract the video screen from the expanded position achieved by the present invention.

Further, the viewing screen 12 is formed from a relatively heavy material which may be treated or coated with a reflective or like substance or material commonly utilized in the projection screen industry for providing a clear, accurate depiction of the video images projected thereon. Also, the viewing screen 12 may have a surrounding border as at 18 and a central viewing area as at 20. When the viewing screen 12 is in its exposed, expanded position, for viewing it assumes a taut, vertically oriented position, as best shown in FIG. 1, so as to provide a "flat" viewing area thereby facilitating accurate depiction of the video images projected thereon.

Figure 2:
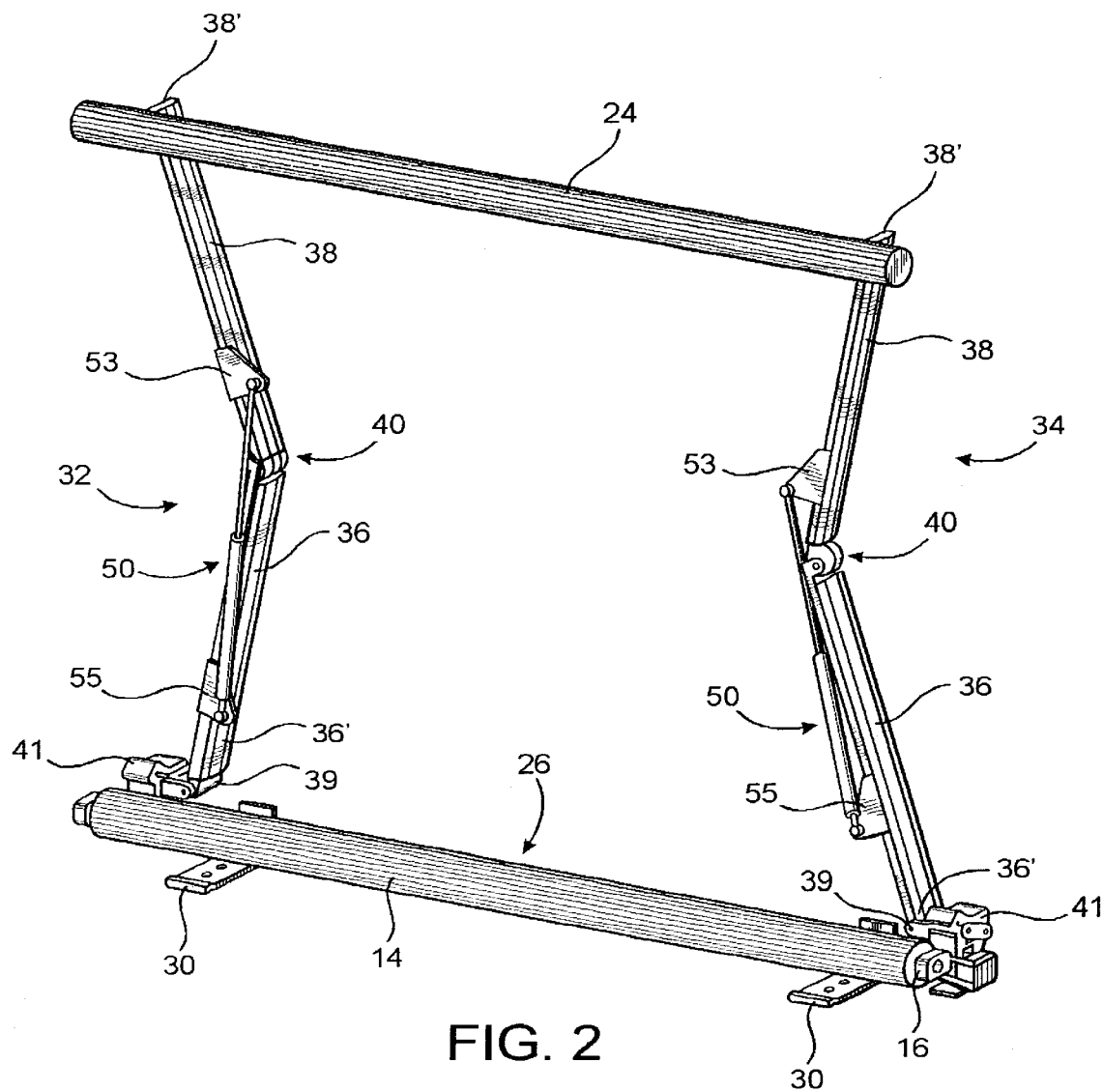
FIG. 2 is a perspective view of a support frame portion including various structural components thereof absent the viewing screen being attached thereto.
Figure 3:
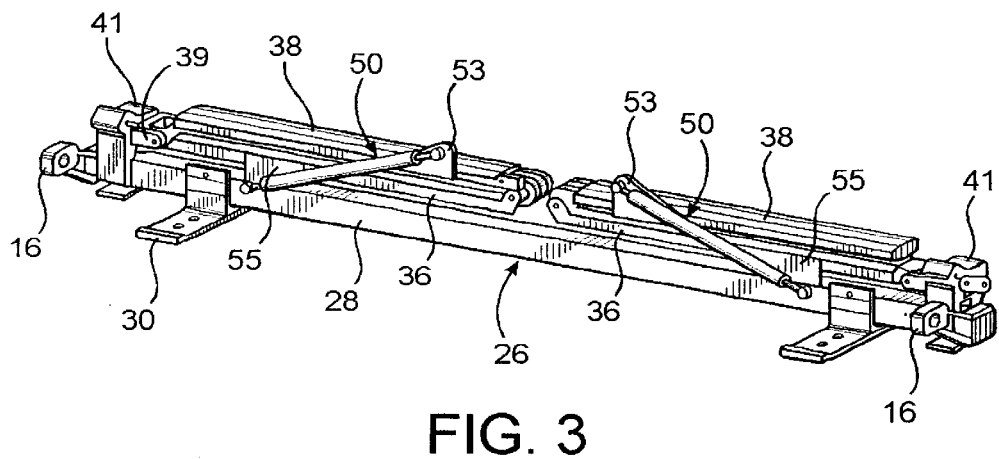
FIG. 3 is a perspective view of portions of the support frame as shown in FIG. 2 wherein the support frame is represented in a stored or collapsed position.

The video projection screen assembly of the present invention further comprises a support frame shown in phantom in FIG. 1 and shown in more detail in FIGS. 2 and 3. More specifically, the support frame includes a first portion 24 and the base portion 26. The first portion 24 is preferably in the form of an elongated rod or bar fixedly attached to the upper, outermost end of the screen 12, as clearly shown in FIG. 1. The bar 24 travels with and/or pulls the screen 12 as it moves between the collapsed position for storage and the expanded position, exposed for viewing. In addition to the take-up roller, the base portion 26 may include an elongated mounting or support bar 28 as well as a plurality of mounting brackets 30 secured or attached to the support bar 28 and serving to fixedly attach the support frame, to an exterior supporting surface, such as within a concealing cabinet or housing or base or to another support surface such as a desk or table top wherein the entire projection assembly is mounted by means of the securing brackets 30. It is noted, however, that in a preferred embodiment, the securing brackets 30 may comprise a removable structure so as to facilitate portability of the assembly. Also in the preferred embodiment wherein the support frame is secured to a cabinet or housing, the cabinet or housing may be structured to be transportable, such as on a plurality of casters, or may be fixed in place if a more permanent placement of the video projection screen assembly 10 is preferred. In either instance, the base portion 26 preferably provides a fixed reference against which the screen expands, and an efficient housing to receive and retain the rolled up or retracted screen 12.

An important structural feature of the support frame of the present invention is that it includes at least one but preferably two spaced apart sets of arms as at 32 and 34. Each of the sets of arms 32 and 34 includes a pair of arm segments, such as a lower arm segment 36 and an upper arm segment 38, pivotally connected to one another at correspondingly positioned ends by means of a "knuckle" joint generally indicated as 40. The sets of arms 32 and 34 may be considered part of a positioning assembly which serves to position and maintain the viewing screen 12 in the expanded position as shown in FIG. 1, wherein such expanded position is at least partially defined by the viewing screen 12 being disposed in a planer, vertical orientation and being sufficiently taut to assure the flatness of the exposed viewing surface 20 for video images being depicted thereon. As clearly shown in FIG. 2, the arm sets 32 and 34 are drivingly interconnected between the base portion 26 and the first portion 24 of the support frame such that extension thereof spaces the first portion 24 and base portion 26 from one another. Preferably, outer distal ends 38' of the upper arm segments 38 are pivotally connected to the first portion 24. Conversely, the distal ends as at 36' of the lower arm segments 36 are pivotally or otherwise connected by a pivot coupling 39 to the base portion 26. In the preferred embodiment, each of the couplings 39 may be fixedly secured to the base portion 26 and can be considered a part thereof. Mounting brackets or like attachments 41 serve to support and fixedly secure the couplings 39 to the base portion 26 and are to be considered a part thereof.

An important feature of the present invention is the inclusion in the aforementioned positioning assembly of at least one, but preferably two piston assemblies. Although a variety of strong piston assemblies may be utilized, in the preferred embodiment, a pair of gas springs 50 are cooperatively structured and drivingly interconnected with each of the sets of arms 32 and 34 and preferably between the lower arm segment 36 and the upper arm segment 38 of each of the sets of arms 32 and 34. As set forth above, FIGS. 2 and 3 respectively show the support frame in the expanded and collapsed positions for viewing and storage. When in the collapsed position, the gas springs 50 associated with each of the arm sets 32 and 34 are disposed in a compressed position, as shown in FIG. 3. When in such compressed position, the gas springs exert an outwardly extending or "driving force" on the upper arm segments 38 of each of the arms sets 32 and 34. As such, in the preferred embodiment a lock assembly is provided so as to counter the force of the gas springs 50 and maintain the screen 12 in the retracted position until use is desired. In the preferred embodiment, the lock assembly is integrated as part of the take-up structure couplings 16, such as utilizing a latch, pin or clutch mechanism on the drive rollers which retract the screen when actuated. Moreover, it is preferred that the lock assembly be remotely actuatable so as to permit the screen to be remotely deployed into its expanded position when desired. Along these lines, remote retraction is also contemplated.

Because of the strength of the gas springs 50, when the viewing screen 12 is released from its retracted, collapsed position, it is essentially, "automatically" positioned into its exposed, expanded position as the respective gas springs 50 associated with each of the sets of arms 32 and 34 expand outwardly into their normally extended position, as shown in FIG. 2, and straighten the arms. Interconnection of each of the gas springs 50 to the respective arm segments 36 and 38 of each arm set 32 and 34 occurs by means of fixedly mounted flanges or the like 53 and 55.

Figure 6:
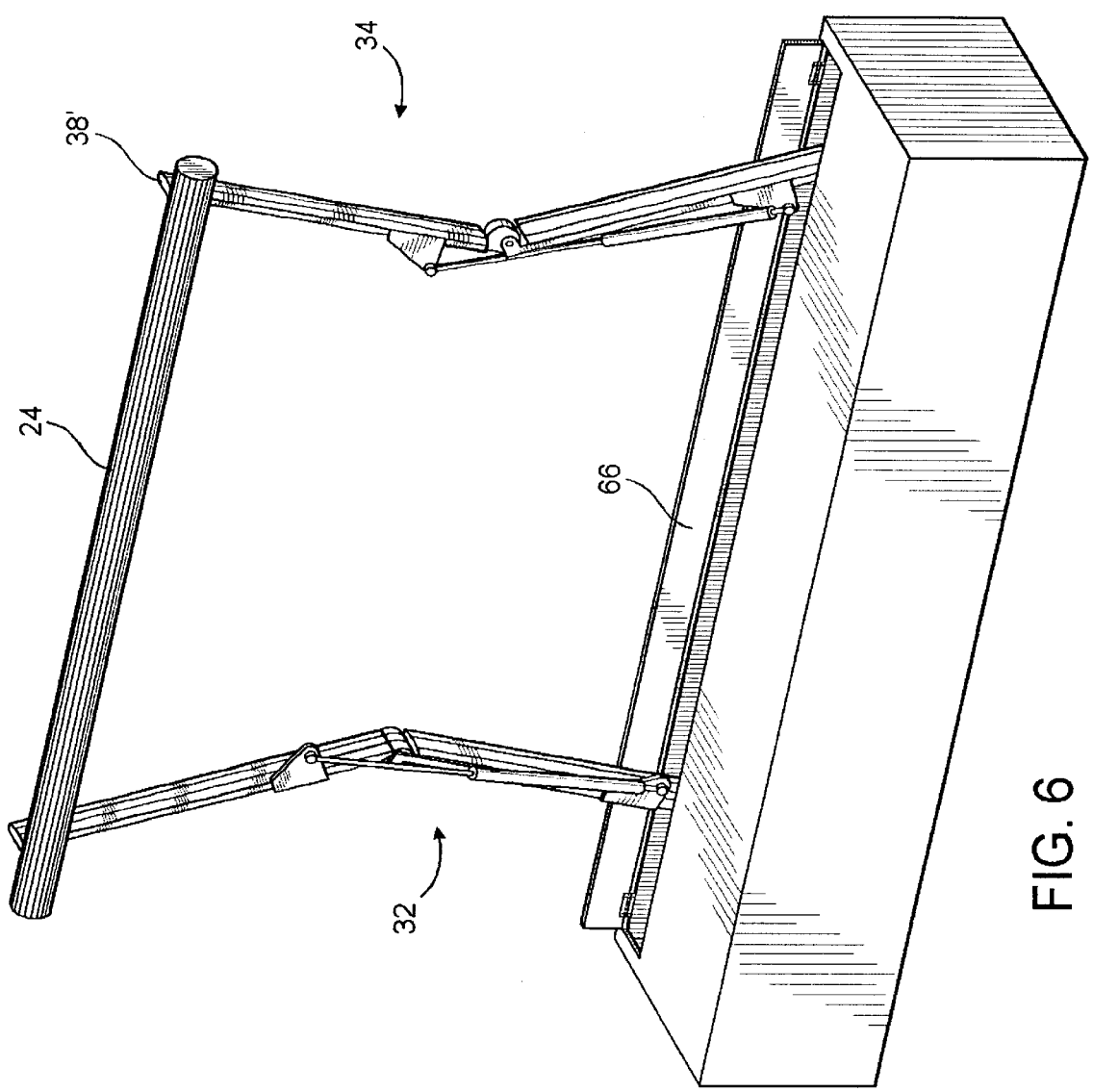
FIG. 6 is a perspective view of the present invention illustrating the preferred integration of a concealing cabinet structure.

The utilization of the gas springs 50 is especially beneficial in the embodiment of FIG. 6. In this embodiment, the screen 12 and generally a remainder of the support frame are concealed within a cabinet 65. The cabinet 65 functions as part of the base portion, and as previously recited provides a secure base to which the support frame is fastened and against which the gas pistons 50 gain leverage for deploying the screen 12. In the preferred cabinet embodiment, a lid 66 is provided to conceal the presence of the video projection screen assembly 10. As a result, the overall assembly can be integrated into a floor or other cabinet, with only the lid 66 being required to be free from encumbrances. In this regard, the preferred structure of the lid includes a hingedly attached structure that is normally in the closed position. As a result, when remote deployment of the screen 12 is desired, the force of the screen being lifted is sufficient to open the lid 66 of the cabinet 65. Such provides for a particularly aesthetic and concealed appearance, and is preferred especially because higher quality cabinet material also tends to be heavier, but the cost of an additional lid opening mechanism may not be desirable. Of course, it is understood that the lid may be remotely opened as part of a secondary mechanism, and the cabinet itself may take on any of a number of configurations including a recessed area within a floor or wall surface depending upon the space constraints and decorative needs of a user. Accordingly, only when the screen 12 is required will it be visible within a room.

Although the gas springs can be configured of varying sizes and strengths to correspond with the relatively heavy weight of a high quality viewing screen 12 and to ensure that the viewing screen 12 is maintained in a vertical orientation and overall planer configuration as it travels to and is maintained in the exposed position of FIG. 1, the positioning assembly may also include an auxiliary spring assembly, such as a biasing spring structure, preferably mounted on the interior of each of the arm sets 32 and 34. Such biasing spring structure can be associated with each of the arm sets 32 and 34 may be of somewhat typical construction. Such construction provides a spring loading serving to normally bias or facilitate outward extension or separation of the lower and upper arm segments 36 and 38 of each of the arm sets 32 and 34. More specifically, the spring loading of the arm sets caused by the internally mounted biasing spring structure may be provided by running a steel cable from the inside of one arm segment, around the knuckle joint 40 which serves to pivotally interconnect corresponding ends of the respective arm segments 36 and 38 of each arm set to the inside of the opposite arm segment. In one arm segment, the steel cable will be tied off or secured. Inside the other arm segment the steel cable would be connected to one or more steel coil springs serving to specifically define a biasing spring structure on the interior of one of the arm segments 36 or 38. Such biasing spring exerts a pulling force on the cable. This pulling force, wherein the cable passes around the knuckle joint, causes the arm segments to be biased outwardly so as to generally assist them in separating or assuming the expanded position, as shown in FIG. 2, if necessary. Still, due to the fact that screen 12 is formed from a relatively heavy material and also that the viewing screen 12 is maintained in a vertical orientation, the force derived from the spring loading of the biasing spring within and in cooperation with the two arm sets 32 and 34 is generally not sufficient in and of itself to selectively and effectively position the viewing screen 12 in the desired exposed orientation. Accordingly, if used, they will generally supplement the preferred positioning assembly, namely a gas spring 50 associated directly with at least one, but preferably each of the arm sets 32 and 34.

Figure 4:
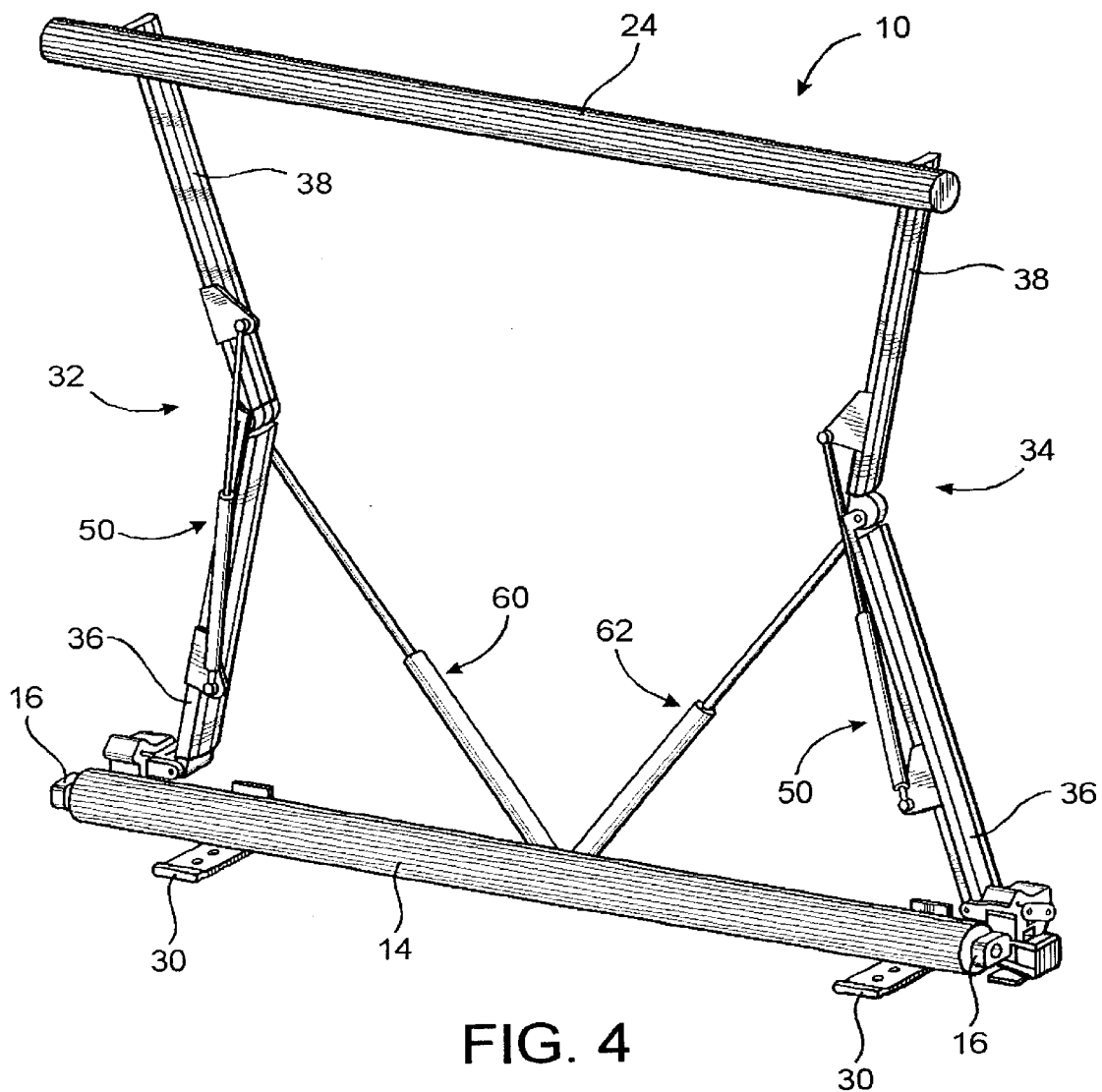
FIG. 4 is a perspective view of another embodiment of the support frame of the present invention different from the embodiment of FIGS. 2 and 3 and absent a viewing screen being attached thereto.
Figure 5:
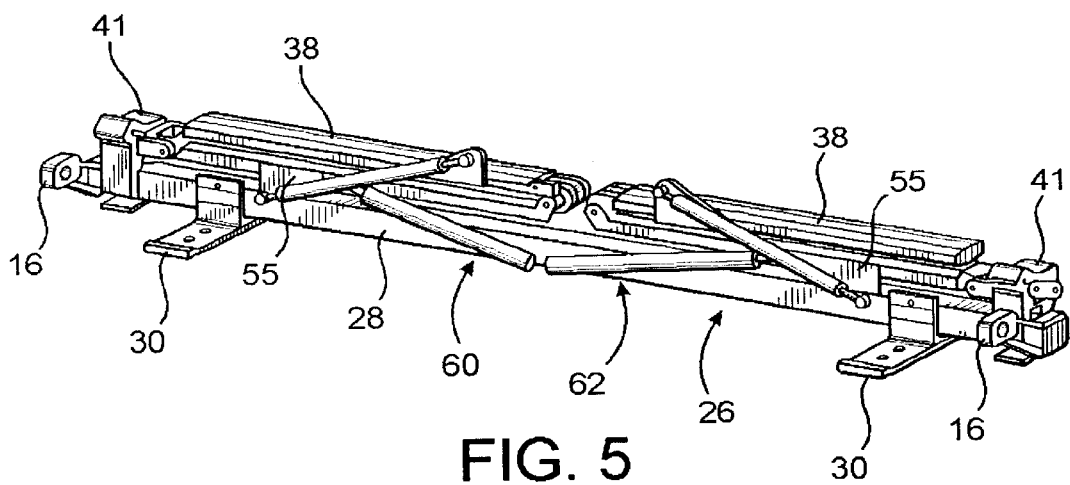
FIG. 5 is a perspective view of the embodiment of FIG. 4 in a retracted or collapsed position for storage with certain components shown in FIG. 4 absent from the structure of FIG. 5.

With regard to the FIGS. 4 and 5, another embodiment of the present invention is disclosed wherein supplemental gas springs such as at 60 and 62 may be added to substantially increase the driving force to each of the arms sets 32 and 34. Such supplemental gas springs 60 and 62 are drivingly interconnected between the base portion 26 of the support frame and preferably the lowermost arm segment 36 of each of the arm sets 32 and 34. It is, of course, recognized in the video projection screen industry that significantly large screen sizes are available for use. It is apparent that the larger size of such viewing screens 12 may range in size up to and above 84 inches. Furthermore, the present invention recognizes that the increased weight of such enlarged viewing screens may also necessitate an additional expanding force. In an illustrated embodiment of the invention, the additional expanding force is derived by including at least one, but preferably two supplemental gas springs 60 and 62 associated in driving relation to each of the arm sets 32 and 34 in order to provide a supplemental driving force to efficiently dispose and maintain the larger viewing screen in the vertically oriented, expanded position for viewing. In this additional embodiment, each of the supplemental gas springs are interconnected between the base portion defined by support bar 28 and the lowermost arm segment 36 of each set of arms 32 and 34. As a result, the force of the supplemental gas springs functions to straighten the lowermost arm segments 36 relative to the base portion 26.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A video projection screen assembly comprising:
    a) a screen structured to have video images projected thereon and formed of a material having sufficient flexibility to be disposed between an expanded position and a collapsed position,
    b) a support frame attached in supporting relation to said screen and structured to dispose and maintain said screen in a flat, vertical orientation when said screen is in said expanded position,
    c) said support frame comprising a first portion connected to said screen and moveable therewith, and a base portion fixedly disposed relative to said screen and said first portion when said screen travels between said expanded and collapsed positions,
    d) said support frame further comprising a positioning assembly movably interconnected with said first portion and structured to facilitate travel of said screen from said collapsed position to said expanded position,
    e) said positioning assembly including at least one piston assembly positionable between a compressed position and an extended position and disposed in driving relation to said first portion and accordingly said screen connected thereto,
    f) said at least one piston assembly cooperatively structured with a remainder of said positioning assembly to normally bias and maintain said screen in said expanded position,
    g) said piston assembly including a gas spring structured to expand with sufficient force so as to urge and maintain said first portion of said support frame and accordingly said screen connected thereto in said expanded position, and
    h) said positioning assembly further including an auxiliary spring assembly interconnected between said base portion and said first portion and cooperatively structured with said gas spring to further bias said screen towards and into said expanded position.

2. A video projection screen assembly as recited in claim 1 wherein said gas spring is structured to urge said first portion automatically upwardly into spaced apart relation from said base portion so as to define said expanded position of said screen.

3. A video projection screen assembly as recited in claim 2 wherein said base portion is structured to contain said first portion and said screen upon said screen being in said compressed position, said base portion being portable so as to facilitate expansion of said screen in a remote location.

4. A video projection screen assembly as recited in claim 3 wherein said base portion includes a pivoting lid member, said lid member structured to contain said first portion and said screen within said base portion when in said compressed orientation.

5. A video projection screen assembly as recited in claim 4 wherein said positioning assembly is structured to automatically open said lid member upon positioning of said screen into said expanded position.

6. A video projection screen assembly as recited in claim 1 further comprising a lock assembly structured and disposed to maintain said first portion in closely spaced relation to said base portion, and thereby maintain said screen in said compressed orientation.

7. A video projection screen assembly as recited in claim 6 wherein said lock assembly is remotely actuatable so as to release said first portion and permit said piston assembly to automatically urge said first portion upwardly into spaced apart relation from said base portion so as to define said expanded position of said screen.

8. A video projection screen assembly as recited in claim 1 wherein said support frame further comprises at least one set of arms interconnected between said base portion and said first portion.

9. A video projection screen assembly as recited in claim 8 wherein said one set of arms comprises two arm segments pivotally interconnected to one another at corresponding ends of each arm segment, and each arm segment including a distal end respectively connected to a different one of said first portion and base portion; said one gas spring interconnected in biasing relation with at least one of said two arm segments so as to normally pivotally extend said distal ends of said arm segments apart from one another.

10. A video projection screen assembly as recited in claim 9 wherein said one gas spring is coupled between both of said arm segments.

11. A video projection screen assembly as recited in claim 1 wherein said auxiliary spring assembly is mounted on said one set of arms and is cooperatively structured therewith to further facilitate disposal and maintenance of said screen in said vertical orientation and said expanded position.

12. A video projection screen assembly as recited in claim 1 wherein said support frame further comprises at least two sets of arms, each set of arms disposed in spaced relation to one another and interconnected between said base portion and said first portion.

13. A video projection screen assembly as recited in claim 12 further comprising said auxiliary spring assembly mounted on each of said two sets of arms and cooperatively structured with respective ones of said two sets of arms to further facilitate disposal and maintenance of said screen in said vertical orientation and said expanded position.

14. A video projection screen assembly as recited in claim 12 wherein each of said two sets of arms comprises two arm segments pivotally connected to one another at corresponding ends of said two arm segments, said two arm segments of each set of arms collectively interconnected between said first portion and said base portion.

15. A video projection screen assembly as recited in claim 14 wherein said positioning assembly comprises at least two of said gas springs each connected in driving relation with at least one of said two arm segments of a different one of said two sets of arms and structured to normally urge said distal ends of said arm segments into spaced apart relation from one another.

16. A video projection screen assembly as recited in claim 15 wherein said gas springs are connected between said arm segments of each of said sets of arms.

17. A video projection screen assembly as recited in claim 16 wherein said auxiliary spring assembly comprises at least two biasing springs each connected to a different one of said two arms sets and being disposed and cooperatively structured with a respective one of said two gas springs to further bias said screen into said vertical orientation and said expanded position.

18. A video projection screen assembly as recited in claim 16 wherein said positioning assembly further comprises at least one supplementary gas spring mounted on said support frame in biasing relation to one of said two sets of arms.

19. A video projection screen assembly as recited in claim 18 wherein said positioning assembly further comprises two supplementary gas springs each mounted on said support frame in biasing relation to a different one of said two sets of arms.

20. A video projection screen assembly as recited in claim 19 wherein each of said two supplemental gas springs is interconnected between said base portion and one arm segment of a different one of said two sets of arms.

21. A video projection screen assembly as recited in claim 16 wherein said collapsed position of said screen is at least partially defined by a folded, side by side orientation of said arm segments of each of said two sets of arms and a compressed, retracted orientation of each of said two gas springs.

22. A video projection screen assembly as recited in claim 1 wherein said screen is structured to retract into a rolled up orientation within said base portion.

23. A video projection screen assembly as recited in claim 1 further including a retraction assembly structured to retract said screen into said base portion so as to counter a force of said positioning assembly and position said screen in said collapsed position.

24. A video projection screen assembly designed to be selectively disposed between an exposed position and a retracted position, said assembly comprising:
   a) a screen formed of a material having sufficient flexibility to be disposed between an expanded position and a collapsed position,
   b) a support frame attached in supporting relation to said screen and structured to dispose and maintain said screen in a vertical orientation when said screen is in said expanded position,
   c) said support frame comprising a first portion connected to said screen and moveable therewith and a base portion fixedly mounted relative to said screen and said first portion as said screen travels between said expanded and collapsed positions,
   d) a positioning assembly including at least one gas spring cooperatively disposed and structured to exert a biasing force on said first portion tending to urge said screen into said vertically oriented, expanded position, and
   e) said positioning assembly further including an auxiliary spring assembly interconnected between said base portion and said first portion and cooperatively structured with said gas spring to further bias said screen towards and into said expanded position.

* * * * *